(12) United States Patent
Flehmig et al.

(10) Patent No.: US 9,969,433 B2
(45) Date of Patent: May 15, 2018

(54) METHOD FOR MANUFACTURING A HOLLOW PROFILE, A HOLLOW PROFILE AND A VEHICLE BODY

(75) Inventors: Thomas Flehmig, Ratingen (DE); Lothar Patberg, Moers (DE); Markus Zörnack, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 972 days.

(21) Appl. No.: 12/921,726

(22) PCT Filed: Mar. 4, 2009

(86) PCT No.: PCT/EP2009/052549
§ 371 (c)(1),
(2), (4) Date: Nov. 10, 2010

(87) PCT Pub. No.: WO2009/112407
PCT Pub. Date: Sep. 17, 2009

(65) Prior Publication Data
US 2011/0045216 A1    Feb. 24, 2011
US 2011/0200766 A2    Aug. 18, 2011

(30) Foreign Application Priority Data
Mar. 12, 2008    (DE) .................. 10 2008 013 830

(51) Int. Cl.
*B23K 26/00*    (2014.01)
*B62D 25/02*    (2006.01)
(Continued)

(52) U.S. Cl.
CPC .............. *B62D 25/02* (2013.01); *B23K 26/28* (2013.01); *B62D 25/00* (2013.01); *B62D 25/04* (2013.01); *Y10T 428/13* (2015.01)

(58) Field of Classification Search
USPC ........... 219/121.63, 121.64, 121.78, 121.79, 219/121.83, 121.82, 121.67; 296/205,
(Continued)

(56) References Cited

U.S. PATENT DOCUMENTS 4,682,812 A * 7/1987 Hurten et al. ............ 296/203.03
5,221,585 A * 6/1993 Kresse et al. ................ 428/573
(Continued)

FOREIGN PATENT DOCUMENTS

DE    10003878    8/2001
DE    10307621    9/2004
(Continued)

OTHER PUBLICATIONS

International Search Report for International Application No. PCT/EP2009/052549 dated Jun. 12, 2009.

*Primary Examiner* — Thien S Tran
(74) *Attorney, Agent, or Firm* — Reinhart Boerner Van Deuren P.C.

(57) ABSTRACT

A hollow profile that has improved handling ability and a good ability to be attached to other components and a method for producing the hollow profile. In the method for producing a hollow profile having at least two half shell sheets, a first half shell sheet is applied to a first side of web plate along two axially running joint edges of the first half shell sheet, a second half shell sheet is applied to a second side of the web plate along two axially running joint edges of the second half shell sheet, and then the joint edges of the half shell sheets are subsequently joined to the web plate. An edge section of the web plate projects beyond the contact area of at least one joint edge so that at least one flange is formed for attaching other components. The hollow profile formed has two half shell sheets and a web plate disposed between the half shell sheets, which can form part of a vehicle body.

19 Claims, 6 Drawing Sheets

(51) Int. Cl.
*B23K 26/28* (2014.01)
*B62D 25/00* (2006.01)
*B62D 25/04* (2006.01)

(58) Field of Classification Search
USPC ......... 296/203.02, 203.03, 29, 30, 185, 187,
296/187.01, 187.03, 187.08, 187.12,
296/188 X, 189, 193.06, 195, 198, 202,
296/203.01, 209 X; 52/731.6, 735.1
See application file for complete search history.

(56) References Cited

U.S. PATENT DOCUMENTS

| | | | | |
|---|---|---|---|---|
| 5,380,978 A | * | 1/1995 | Pryor | 219/121.64 |
| 5,810,428 A | * | 9/1998 | Maki | 296/203.02 |
| 2002/0180245 A1 | * | 12/2002 | Dogan et al. | 296/205 |
| 2002/0195840 A1 | * | 12/2002 | Mishima et al. | 296/203.01 |
| 2004/0195863 A1 | * | 10/2004 | Saeki | 296/203.01 |
| 2006/0108831 A1 | * | 5/2006 | McClure et al. | 296/182.1 |
| 2006/0249969 A1 | * | 11/2006 | Gruneklee et al. | 296/30 |
| 2007/0246286 A1 | * | 10/2007 | Henze | 180/349 |
| 2008/0052908 A1 | | 3/2008 | Reed et al. | |
| 2008/0106123 A1 | * | 5/2008 | Lakic | 296/205 |
| 2008/0224502 A1 | * | 9/2008 | Miki | 296/203.02 |

FOREIGN PATENT DOCUMENTS

| | | | |
|---|---|---|---|
| DE | 19523005 | 5/2006 | |
| DE | 10 2006 001 061 A1 | 9/2007 | |
| EP | 0 205 804 A2 | 12/1986 | |
| EP | 1 264 758 A1 | 12/2002 | |
| JP | 11301524 A * | 11/1999 | B62D 25/20 |
| WO | 2009/001910 A1 | 12/2008 | |

\* cited by examiner

METHOD FOR MANUFACTURING A HOLLOW PROFILE, A HOLLOW PROFILE AND A VEHICLE BODY

CROSS-REFERENCE TO RELATED APPLICATIONS

This application is a National Phase Application of International Application No. PCT/EP2009/052549, filed on Mar. 4, 2009, which claims the benefit of and priority to German patent application no. DE 10 2008 013 830.4-56, filed on Mar. 12, 2008. The disclosures of the above applications are incorporated herein by reference in their entirety.

FIELD OF THE INVENTION

The invention relates to a method for manufacturing a hollow profile comprising at least two half-shell sheets, to a hollow profile having two half-shell sheets and having a web plate located between the half-shell sheets, and to a vehicle body.

BACKGROUND

Methods and hollow profiles of the kind mentioned at the outset are already known from the prior art. Patent application DE 10 2005 044 172 A1, for example, describes an arrangement consisting of a plurality of moulded parts between which a reinforcement element is positioned, wherein the moulded parts and the reinforcement element are welded at flanges which project outwards and are provided on all components. The reinforcement element essentially provides the profile, which is formed from the moulded parts, with improved dimensional stability. However, the disadvantage of the procedure described in DE 10 2005 044 172 A1 is that all of the joints between the moulded parts which are to be joined and the reinforcement element are joined at points which lie outside the boundaries defining the interior of the profile. The flanges projecting outwards increase the space requirement of the individual components of the profile and of the profile itself. As a result, in particular the manageability of the hollow profiles, for example when storing but also when being processed, is affected. Moreover, the profile flanges are only suitable in a limited way for joining the profile to other components or, where appropriate, to other profiles.

This is because a joint at the flanges which has already been produced can be affected by subsequent joining processes to be performed at the flanges. This difficulty could be avoided by carrying out the joining processes that are used to manufacture the profile and are performed at the flanges and the joining processes that are used to join the profile to another component and are performed at the flanges, at the same time, essentially in the same work step. However, this would considerably restrict the flexibility of use of the profile. Alternatively, it is possible to provide flanges with a specific minimum width that provides a spatial separation between two joining processes, which to a large extent are independent from one another, that are performed at these flanges. However, the space requirement would be additionally increased by this action.

Furthermore, it has come to light that the welding of sheets performed at flanges can lead to a non-uniform welding result if the flanges have thicknesses that differ from one another. In order to avoid this effect, according to the prior art the thicker flanges can be reduced to approximately the thickness of the thinnest flange. For this purpose, milling, grinding or stamping techniques are applied. An example of a stamping technique is disclosed in patent application DE 10 2004 040 569 A1. However, the number of work steps in advance of the actual method for manufacturing a profile is increased by this procedure. In addition, the material of the sheets is already exposed to additional stress in the form of deformation before the actual manufacturing process.

SUMMARY OF THE INVENTION

An Exemplary embodiments provide a hollow profile that has improved manageability and can be connected well to other components and a suitable method for manufacturing such a hollow profile.

One embodiment provides a method for manufacturing a hollow profile that includes at least two half-shell sheets. Two axially running joint edges of a first half-shell sheet are applied to first side of a web plate, two axially running joint edges of a second half-shell sheet are applied to an opposite side of the web plate, and then the joint edges of the half-shell sheets are subsequently joined to the web plate. An edge section of the web plate projects beyond a contact area of at least one joint edge, so that at least one flange is formed for connecting further components.

Hollow profiles manufactured by means of the method above can have joints that are not arranged on flanges projecting from the profile and outside the actual profile, but rather have joints that are integrated into the contour of the profile. In this way, the joints are located in a less exposed position that may lessens the effect of the joints on any subsequent further processing steps to which the profile can be subjected. Moreover, providing half-shell sheets required for manufacturing the hollow profile is made easier because these can be formed more compactly without flanges. By dispensing with the flanges, the input of materials is reduced and a reduction in weight is achieved, respectively. In some embodiments, the material of the edge section of the web plate projecting beyond the joint is not stressed by a joining operation, so that the edge section is suitable, in particular as a joint flange, for joining the hollow profile to other components. The joining operations performed for manufacturing the hollow profile, and, where appropriate, the joining operations to be performed for joining the hollow profile to another component, can thus be essentially uncoupled. This provides greater flexibility in the manufacturing method, particularly relating to the sequence of the method steps. The hollow profile is also additionally stiffened by providing the web plate, so that the hollow profile with the web plate has a greater dimensional stability than a hollow profile without a web plate. The geometrical moment of inertia of the hollow profile is also increased by the incorporation of the web plate.

The half-shell sheets do not necessarily have to be shaped symmetrically in relation to one another. The shapes of the two half-shell sheets can differ from one another, providing flexibility in choice of shapes for the hollow profile. Forming the hollow profile from two half-shell sheets, also provides greater design flexibility because the two half-shell sheets can be manufactured from different materials and, where applicable, the two half-sheet sheets can have thicknesses that differ from one another, if it is appropriate for the application.

In some embodiments, the half-shell sheets and/or the web plate can be manufactured from steel or a higher or super high-strength steel alloy. In this way, the advantageous properties of the steel, for example good deformability with high strength, can be exploited.

According to an advantageous embodiment of the method, the joining operation can be carried out by means of a laser welding device. In this way, a high welding speed, weld seams with low geometrical dimensions and a low thermal shape distortion of the material to be welded can be achieved. However, other welding methods and other joining methods, such as bonding and/or soldering, are also suitable for the method.

Furthermore, applying the joint edges to the web plate and/or joining the joint edges to the web plate can be carried out separately for the two half-shell sheets. In this way, great flexibility in configuring the method can be achieved. Thus, initially a first half-shell sheet can be brought into contact with the web plate and then this can be joined at both joint edges to the web plate, before the second half-shell sheet is applied to the web plate and is joined with both joint edges to the web plate. Both half-shell sheets can also initially be brought into contact with the web plate before the joining operations are performed, for example simultaneously at all joint edges. Other variants are also possible. Thus, after applying the first half-shell sheet to the web plate, a first joint edge could be joined to the web plate, whereupon the second half-shell sheet is then initially applied to the web plate and joined with a first joint edge to the web plate, before the joining operations of the second joint edges of the two half-shell sheets are carried out. In other words, the configuration of the method is subject to few restrictions.

The edge section of the web plate projecting beyond the joint can, furthermore, be shortened and/or deformed. In particular, the edge sections can be angled. In this way, the hollow profiles can be developed further for connecting to other components, for example to other profiles and also to shell sheets.

In a further advantageous embodiment of the method, the joint edges of the half-shell sheets are brought into contact approximately in alignment on both sides of the web plate. In this way, the dimensional stability can be increased, in particular against deformation forces acting in the direction of alignment. This is because the capacity to absorb deformation energy in the corresponding direction is augmented by the contact of the joint edges being approximately in alignment.

The web plate does not necessarily have to be a flat, unmodified sheet. In fact, a web plate having reinforcements, beads and/or holes can be used. By providing reinforcement sheets, which are integrated locally into the web plate and, where appropriate, have threaded carriers, the stiffening effect of the hollow profile brought about by the web plate can be increased. The dimensional stability increasing effect of the web plate can, moreover, be influenced in a targeted manner by means of beads. Holes provided on the web plate can, on the other hand, reduce the web plate's contribution to the total weight of the hollow profile.

Furthermore, continuous or discontinuous joints can be produced. A row of spot welds spaced apart from one another can, for example, be considered as a discontinuous joint. The joints can be formed fully continuously or discontinuously, but also in each case in sections, where appropriate alternately, continuously and discontinuously, as is appropriate for the application.

In a further advantageous embodiment of the method, the hollow profile can be subsequently joined to other components at the edge section of the web plate projecting beyond the joint, which edge section ultimately assumes the function of a joint flange.

It is particularly preferred if a hollow profile is produced for vehicle construction, in particular for the vehicle body, because advantages in particular arise here due to improved possibilities for further processing and the saving in weight. A hollow profile of this kind can, for example, be joined as an A-pillar, B-pillar or C-pillar with other vehicle components to a vehicle body.

An embodiment provides a hollow profile having two half-shell sheets and having a web plate located between the half-shell sheets, wherein in each case the two axially running joint edges of the half-shell sheets are butt joined to the web plate, and wherein an edge section of the web plate projects beyond at least one of the joints, so that at least one flange is formed for connecting further components.

In some embodiments, the joints of the hollow profiles are essentially no longer arranged on flanges projecting from the profile, and thereby outside the actual profile, but are rather integrated into the contour of the profile. In this way, the joints are located in a less exposed position, so that further processing of the hollow profile is made easier. By dispensing with the flanges on the half-shell sheets, furthermore the input of materials is reduced and a reduction in weight is obtained, respectively. The edge section of the web plate projecting beyond the joint is particularly suitable as a joint flange for joining the hollow profile to other components. In this way, the hollow profile can be connected well to other components despite saving on flanges on the half-shell sheets. The hollow profile is also additionally stiffened by the web plate, so that it has a greater dimensional stability. The geometrical moment of inertia of the hollow profile is thereby additionally increased.

The joint edges of the half-shell sheets can be welded to the web plate. In this way, a durable join which is stable against stress can be guaranteed between the sheets. Moreover, the weld seams are characterised by small geometrical dimensions, in particular if the welding operation was carried out by a laser welding device.

In addition, at least one edge section of the web plate can be angled. As a result, the space requirement of the hollow profile can be reduced. Furthermore, there is a versatile possibility of connecting the hollow profile to other components due to the angling or, respectively, the capability of being angled of the edge sections of the web plate.

It is possible for the joint edges of the half-shell sheets to be joined approximately in alignment on both sides of the web plate. In this way, better dimensional stability is given, in particular against deformation forces acting in the direction of alignment. This is because the capacity to absorb deformation energy in the corresponding direction is augmented by the contact of the joint edges being approximately in alignment.

The web plate can have reinforcements, beads and/or holes. By providing reinforcement sheets, which are integrated locally into the web plate and, where appropriate, have threaded carriers, the stiffening effect of the hollow profile brought about by the web plate can be increased. The dimensional stability increasing effect of the web plate can, moreover, be influenced in a targeted manner by means of beads. Holes provided on the web plate can, on the other hand, reduce the web plate's contribution to the total weight of the hollow profile.

The joints can be continuously or discontinuously formed. A continuous joint can be necessary if the joint, in addition to the joining effect, is also to have a sealing effect. By means of a discontinuous joint, on the other hand, the surface area of the material of the half-shell sheets and/or of the web plate stressed by the joining operations can be kept small.

Furthermore, the hollow profile, in particular an A-pillar, B-pillar or C-pillar, can be provided for vehicle construction. In this way, the low weight and the good further processing possibilities of the hollow profile can be exploited. These properties meet the requirements of, for example, fuel consumption reducing lightweight vehicle construction.

The use of a hollow profile may be preferred in vehicle construction, particularly in body construction for an A-pillar, B-pillar or C-pillar, due to the advantages of the hollow profile.

BRIEF DESCRIPTION OF THE DRAWINGS

Exemplary embodiments will be explained below with respect to the following drawings. In the drawings.

DETAILED DESCRIPTION

Figure 1A:
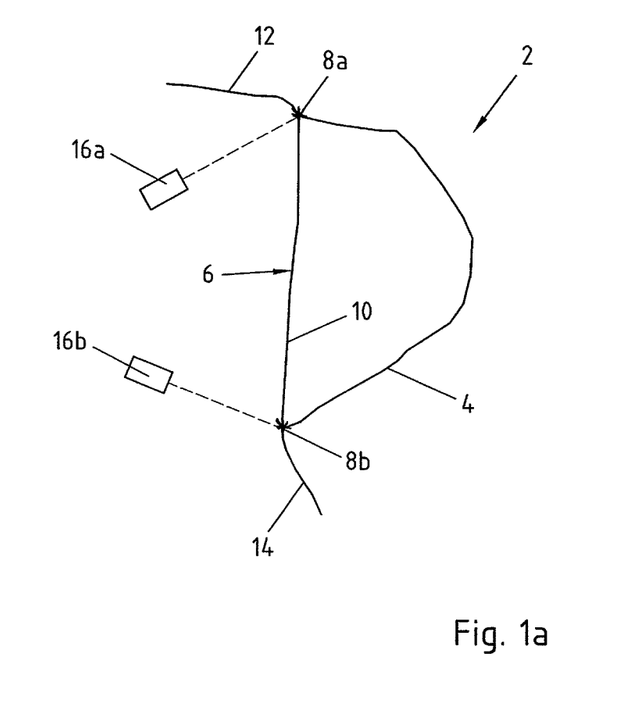
FIGS. 1a, b show a schematic exemplary embodiment of a method for manufacturing a hollow profile.
Figure 1B:
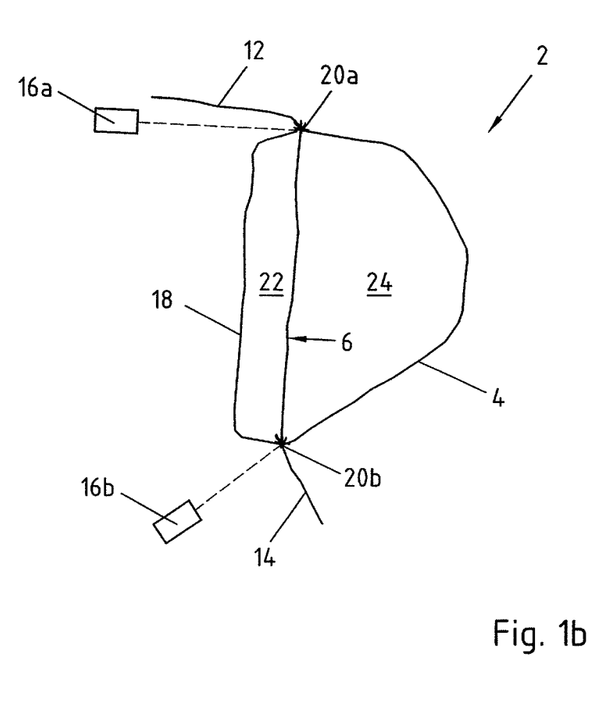

An exemplary method for manufacturing a hollow profile 2 is shown in FIGS. 1a and 1b. In FIG. 1a, a first half-shell sheet 4 and a web plate 6 are illustrated in a schematic sectional view. The first half-shell sheet 4 essentially has a C-shape, with the bulge of the C facing away from the web plate 6. The half-shell sheet 4 is applied to the web plate 6 by bringing two of its axially running joint edges 8a, 8b of the half-shell sheet in contact with the web plate 6. The axial direction in this example is parallel to the imaginary axis of the finished hollow profile 2. The web plate 6 is a sheet with a non-linear contour, which has a rectilinear central section 10 and two outer edge sections 12, 14 which with respect to the central section 10 are angled in opposite directions by angles divergent from one another. It is, of course, possible to use a web plate 6 with a rectilinear contour and to carry out angling of the edge sections 12, 14, where appropriate, after applying the half-shell sheets 4, 18 and joining the half-shell sheets 4, 18 and the web plate 6. Because the joint flanges (outer edge sections 12, 14) of the hollow profile 2, only consist of the web plate 6, and not of a plurality of sheets layers as is usual in the prior art, the angling operation can be carried out particularly easily. The joint edges 8a, 8b of the first half-shell sheet 4 are joined to the web plate 6 along the contact lines, so that a durable join forms between these. In this exemplary embodiment, two laser welding devices 16a, 16b are used which can essentially operate simultaneously. The laser beams (dashed lines) are guided along the contact lines in a direction perpendicular to the plane of FIG. 1a until the weld seams are complete. It is thereby immaterial whether the arrangement consisting of the first half-shell sheet 4 and the web plate 6 is moved relative to the laser welding devices 16a, 16b or vice-versa. Equally, the side from which the laser beams are directed onto the arrangement can be chosen so that it is appropriate to the application. The weld seams are performed continuously in this example. It is, however, also possible to produce a discontinuous weld seam in the form of spot welds spaced apart from one another in a row along the contact line or also an alternate continuous and discontinuous weld seam. Alternative or additional r joining techniques, such as bonding and/or soldering, may be used for the joining.

FIG. 1b in a further method step shows how a second half-shell sheet 18 is applied, from the side opposite the first half-shell sheet 4, with its axially running joint edges 20a, 20b to the web plate 6. The second half-shell sheet 18 also essentially has a C-shape, wherein the contour of the second half-shell sheet 18 differs, however, from the contour of the first half-shell sheet 4. The volume 22 enclosed by the sides of the second half-shell sheet 18 in this particular example is smaller than the volume 24 enclosed by the sides of the first half-shell sheet 4. In this way, an asymmetrical hollow profile 2 can be manufactured. It is also possible in some embodiments, however, for the web plate 6 to form a mirror symmetry line between two approximately identically shaped half-shell sheets 4, 18. By arranging the web plate 6 between the two half-shell sheets 4, 18, the half-shell sheets 4, 18 can be manufactured from materials that differ from one another and/or with thicknesses that differ from one another. Where appropriate, materials that are not compatible with one another can be used for the two half-shell sheets as long as the materials are sufficiently compatible with the material of the web plate 6. being applied to the web plate, the joint edges 20a, 20b of the second half-shell sheet 18 are joined to the web plate 6 using the laser welding devices 16a, 16b. The joint edges 8a, 8b of the first half-shell sheet 4 and the joint edges 20a, 20b of the second half-shell sheet 18 are located in an aligned arrangement in this embodiment of the method. In this way, deformation forces acting along the direction of alignment, the axial direction, can be absorbed or compensated better, respectively, by the finished hollow profile 2. Two joint flanges for connecting the hollow profile 2 to other components are advantageously formed by the two edge sections 12, 14 of the web plate 6 protruding outwards, in other words reaching out, beyond the joints. These edge sections 12, 14 can be subjected to further processing operations after the joining operations have been carried out, for example they can be shortened and/or deformed. It is also possible for only one protruding edge section 14 to be provided and for the other edge section 12 to be joined flush with the joint edges 8a, 20a of the half-shell sheets 4, 18, e if a connection is only required on one side.

Figure 2:
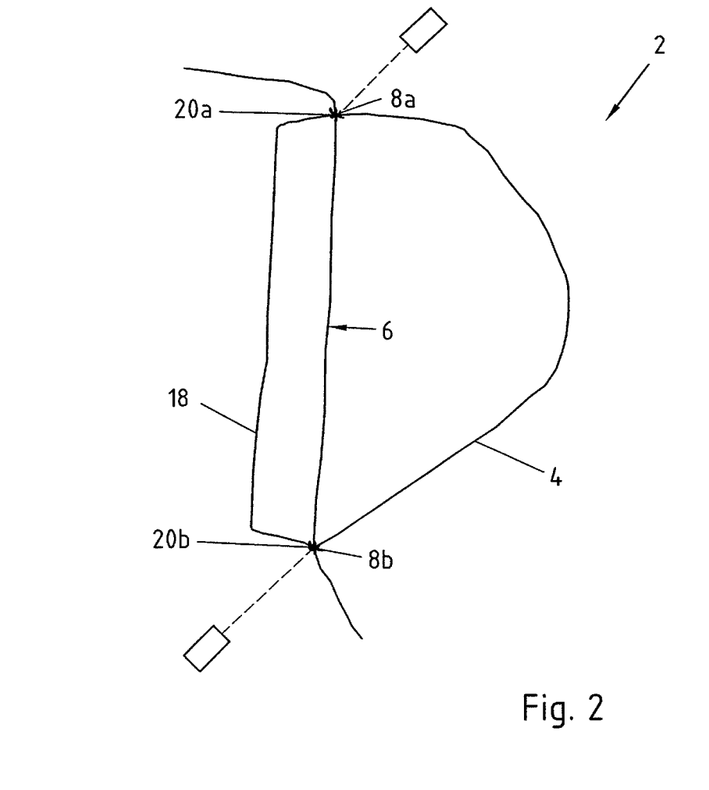
FIG. 2 shows a further schematic exemplary embodiment of a method for manufacturing a hollow profile.

FIG. 2 shows a further exemplary embodiment of the method. In this example, the sequence of the method steps is slightly altered so that initially the two half-shell sheets 4, 18 are applied with their joint edges 8a, 8b, 20a, 20b to the web plate 6 and then, in this example, all four joint edges 8a, 8b, 20a, 20b of the half-shell sheets 4, 18 are joined to the web plate 6 at the same time. This can prove to be advantageous, since the material of the web plate 6 along the contact lines, which later will essentially correspond to the joints, is stressed by a one-time joining process. In the example illustrated in FIG. 2, the laser beams act on both contact lines from different sides to produce the joints. This is in particular meant to illustrate the flexibility of embodiments of the method.

Figure 3:
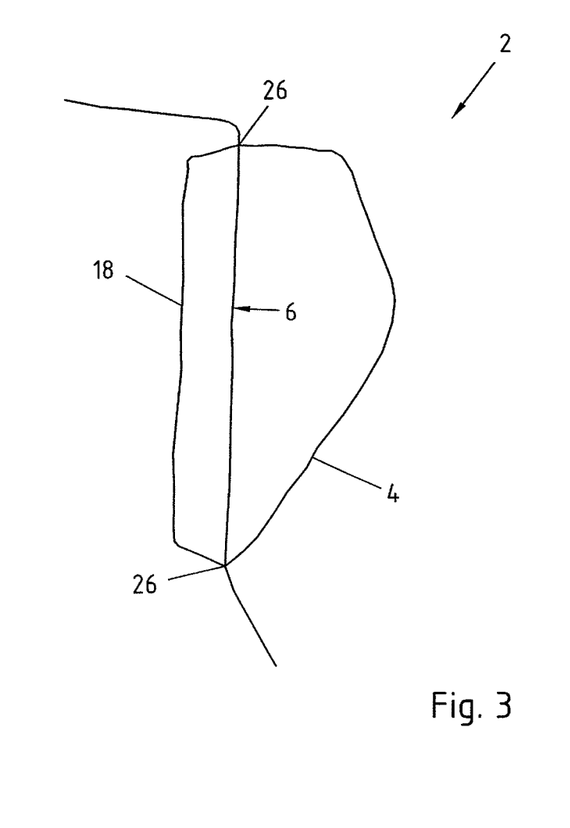
FIG. 3 shows a schematic exemplary embodiment of a hollow profile.

FIG. 3 shows an example of the hollow profile 2 that includes the web plate 6 and two half-shell sheets 4, 18. The asymmetrical configuration of the two half-shell sheets 4, 18 can, for example, be advantageous if the different sides of the hollow profile 2 are exposed to different stresses during use in a finished product, for example in a motor car body. The cross-section of the joints 26 is shown disproportionately enlarged in FIG. 3 for illustrative purposes.

Figure 4:
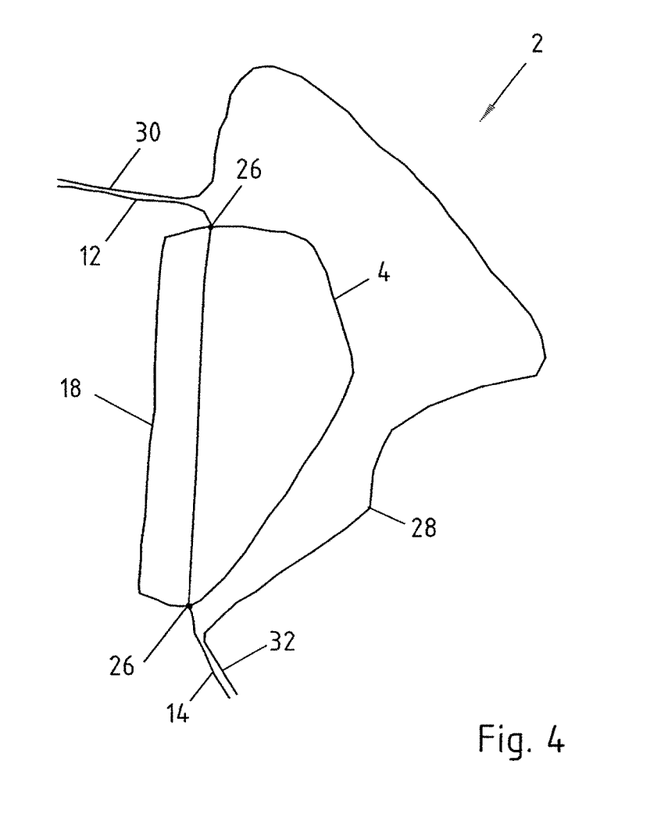
FIG. 4 shows a schematic exemplary embodiment of a hollow profile interacting with another vehicle body component.

FIG. 4 shows an exemplary embodiment of a hollow profile 2 that is manufactured as an A-pillar for use in vehicle construction and interacts with another component of a vehicle body. The joints 26 of the hollow profile 2 are also shown disproportionately enlarged in FIG. 4, as in FIG. 3, for illustrative purposes. Another shell sheet 28 can be seen next to the hollow profile 2 in FIG. 4, the contour of which is formed such that it has flanges 30, 32 that fit the edge sections 12, 14 of the hollow profile 2 which are suitable as joint flanges. The joint flanges 12, 14 of the hollow profile 2 and the joint flanges 30, 32 of the other shell sheet 28 are illustrated slightly spaced apart from one another in this example for the sake of clarity. The intention is, however, that the other shell sheet 28 and the hollow profile 2 are joined to one another at the joint flanges 12, 14, 30, 32. The other shell sheet 28 can, for example, be used as an outer side panel of a vehicle body. The hollow profile 2 in this example is designed as an A-pillar, in which one of the half-shell sheets 18 faces the inside of the vehicle body and the other of the half-shell sheets 4 faces the outside of the vehicle body. As part of the vehicle body, the flange 14, 32 of the arrangement consisting of the hollow profile 2 and the other shell sheet 28, shown at the bottom in FIG. 4, can be used as a door sealing flange and the flange 12, 30 shown at the top in FIG. 4, can be used as a bearing surface, where appropriate also a joining surface, for a motor car windscreen. Because the joints produced for manufacturing the hollow profile 2 are not arranged on the edge sections 12, 14 projecting beyond the joints, it is even possible, in a method for connecting a hollow profile 2 to another shell sheet 28, to initially join the web plate 6, joined to only one of the half-shell sheets 4, along the bent edge sections 12, 14 to the flanges 30, 32 of the other shell sheet 28, and then by applying the joint edges 20a, 20b of the second half-shell sheet 18 to the web plate 6 and the subsequent joining operations to complete the manufacture of the hollow profile 2. This particular example is also meant to demonstrate the flexibility of the method.

Figure 5:
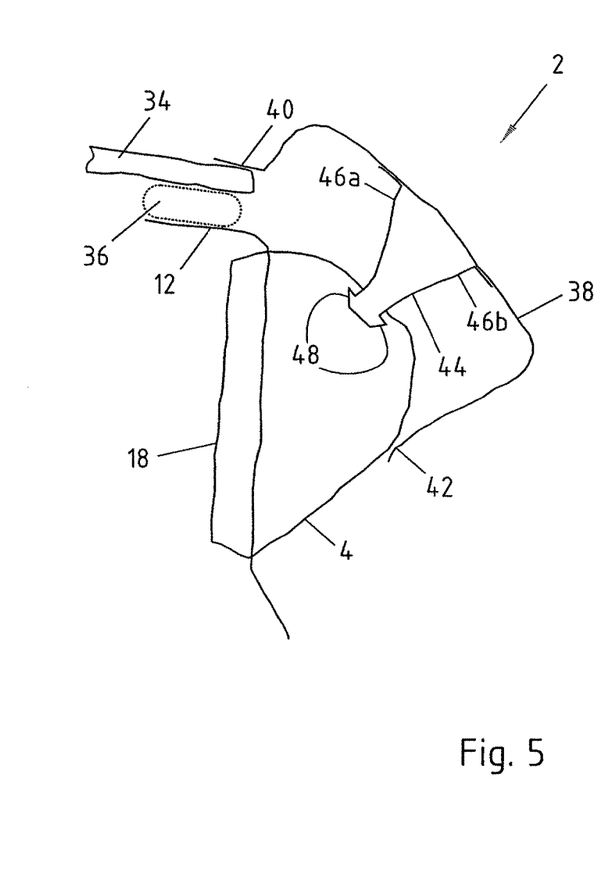
FIG. 5 shows a further schematic exemplary embodiment of a hollow profile interacting with another vehicle body component.

FIG. 5 shows an arrangement which is similar to the arrangement depicted in FIG. 4. However, in addition, FIG. 5 shows a section of a windscreen 34 which is bonded to a flange 12 of the hollow profile 2 by means of an adhesive 36. Furthermore, a moulded element 38 is provided, one end 40 of which rests on the section of the windscreen 34 and may be joined to the section of the windscreen 3, where appropriate, and the other end 42 of which is joined to one of the half-shell sheets 4 of the hollow profile 2. The moulded element 38 is thus used as an outer side panel and can, for example, be manufactured from plastic. Furthermore, a fixing element 44 is provided between the moulded element 38 and the half-shell sheet 4 of the hollow profile 2, whose sides 46a, 46b are joined via flange-like angled edge sections to the moulded element 38 and whose body, which in cross-section has barbs 48, is fixed in the half-shell sheet 4 of the hollow profile 2.

Figure 6:
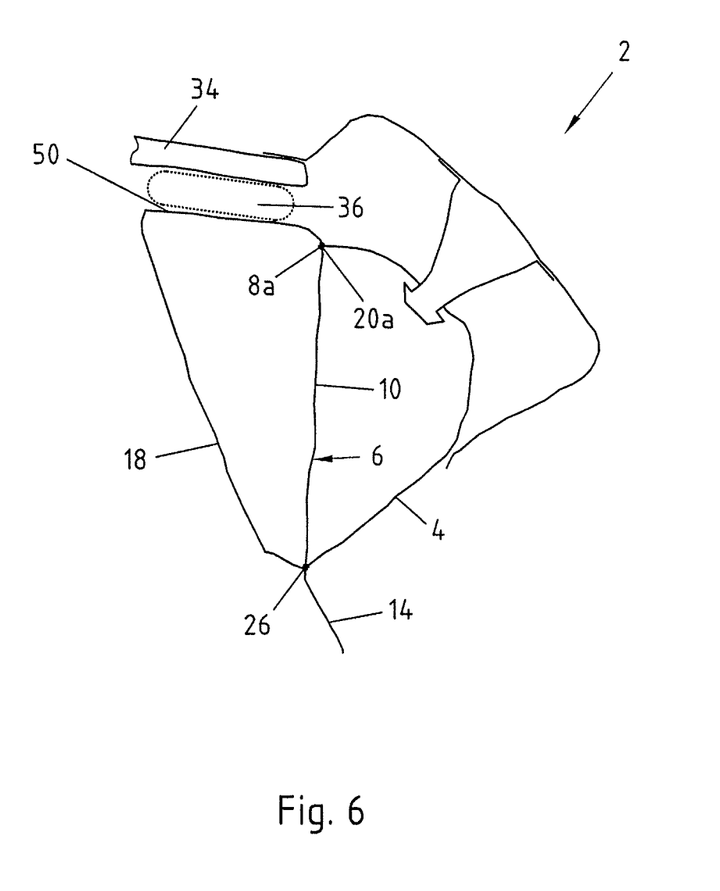
FIG. 6 shows a further schematic exemplary embodiment of a hollow profile according to the invention, which interacts with other vehicle body components, FIGS. 7a, b show a web plate that is suitable for use in a hollow profile.

The exemplary embodiment illustrated in FIG. 6 essentially differs from the exemplary embodiment shown in FIG. 5 by the hollow profile 2 only having one edge section 14 projecting beyond a joint 26 that can be used as a joint flange. The other edge section, in contrast, is joined flush with the joint edges 8a, 20a of the two half-shell sheets 4, 18. In this particular exemplary embodiment, however, one of the half-shell sheets 18 is shaped such that a connecting surface, which is made available by a joint flange, is provided by a rectilinear, elongated side 50 of the half-shell sheet 18. In this example, on the outer surface of this side 50, a section of a windscreen 34 is bonded via an adhesive 36, thereby saving space in the direction of extension of the central part 10 of the web plate 6.

Figure 7A:
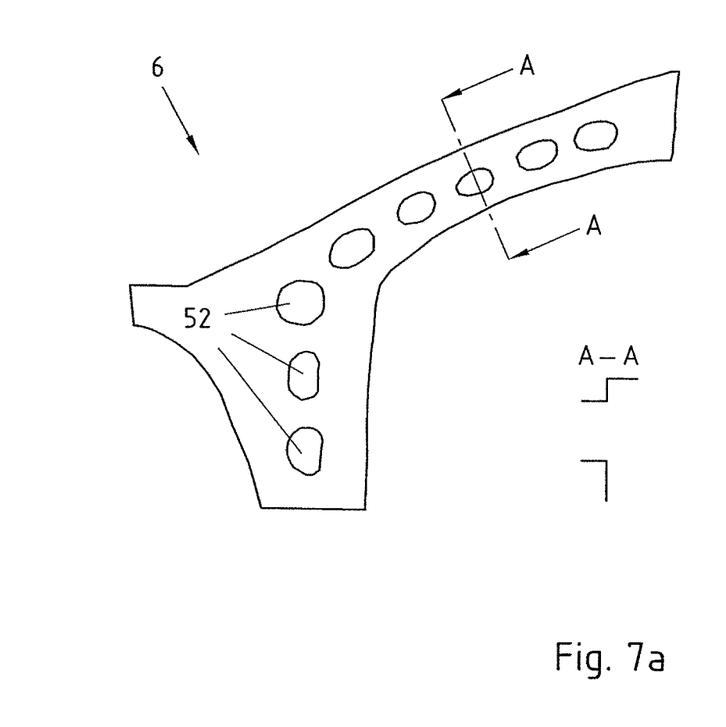
Figure 7B:
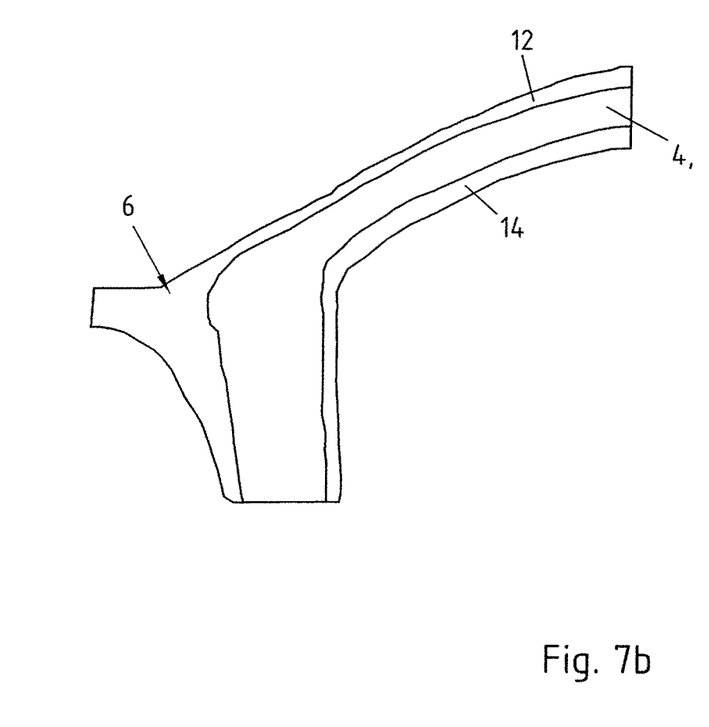

FIG. 7a shows an exemplary embodiment of a web plate 6 in a side view. The web plate 6 can be a complex, three-dimensional structure as illustrated. The web plate 6 in this example is provided with holes 52 which result in a saving in weight on the finished hollow profile 2, into which the web plate 6 is integrated. In addition or as an alternative to the holes 52, reinforcements (not shown) and/or beads (not shown) can also be provided on the web plate 6. By providing reinforcement sheets, which are integrated locally into the web plate 6 and, where appropriate, have threaded carriers, the stiffening effect of the hollow profile 2 brought about by the web plate 6 can be increased. The dimensional stability increasing effect of the web plate 6 can, moreover, be influenced in a targeted manner by providing beads. Along a section A-A through the web plate 6 shown in side view, the three-dimensional form of the web plate 6 is evident. FIG. 7b now shows the web plate 6, known from FIG. 7a, when it interacts with a half-shell sheet 4, 18. The body of the half-shell sheet 4, 18 in this example fully covers the holes 52 in the web plate 6. Moreover, it is evident that the edge sections 12, 14 of the web plate 6 which project beyond the contact lines or joint lines, respectively, do not have to have a constant width over the entire extension of the web plate 6. Rather, the width can be made variable, as is appropriate for the application. In particular, connection to other shell structures can thereby be achieved in a proper manner.

Figure 8A:
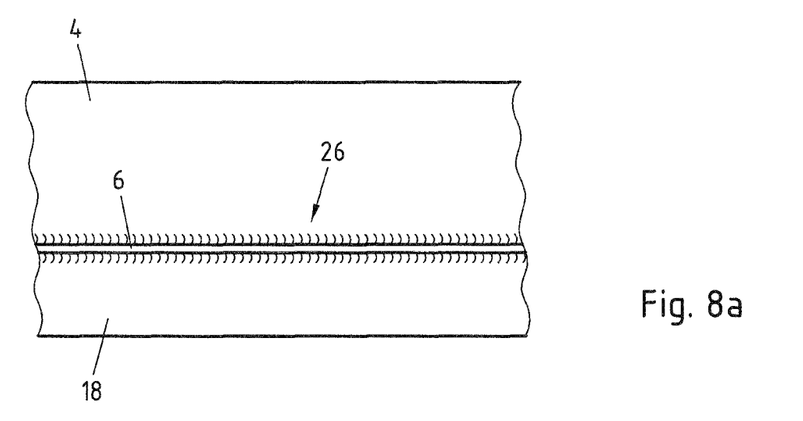
FIGS. 8a, b show a continuous and a discontinuous joint.
Figure 8B:
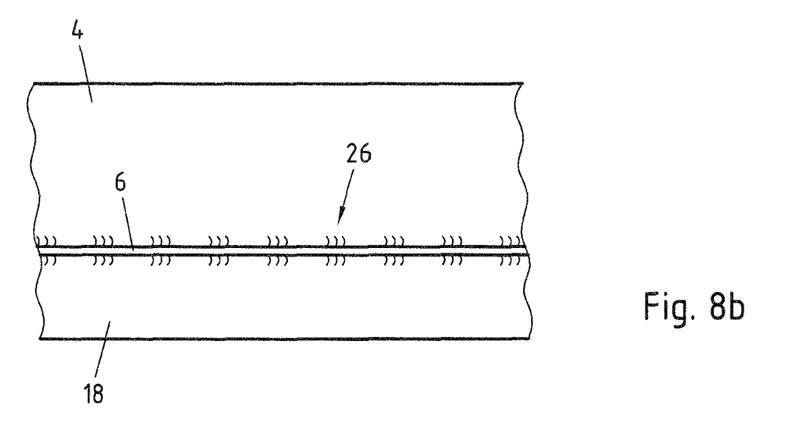

FIGS. 8a and 8b show a continuous and a discontinuous joint 26 of the half shells 4, 18 and the web plate 6.

Figure 9:
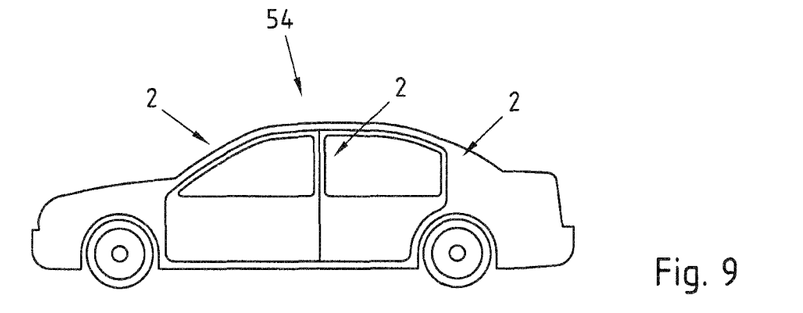
FIG. 9 shows the hollow profile as a part of vehicle body, namely as A-, B-, or C-pillar.

FIG. 9 shows the follow profile 2 as a part of a vehicle body 54, namely as A-, B- or C-pillar.

The invention claimed is:

1. Method for manufacturing a hollow profile, the method comprising:
    applying two axially oriented joint edges of a first flangless half-shell sheet to a first side of a web plate;
    applying two axially oriented joint edges of a second flangless half-shell sheet to an opposite side of the web plate; and
    joining the joint edges of the first half-shell sheet to the web plate and joining the joint edges of the second half-shell sheet to the web plate, wherein an edge section of the web plate projects beyond a contact area of two of the joint edges forming two flanges adapted for connection with other components, and wherein the web plate extends over a whole length of the hollow profile.

2. Method according to claim 1, wherein a laser welding device is used for the joining.

3. Method according to claim 1, wherein applying the joint edges to the web plate is carried out sequentially with respect to the first half-shell sheet and the second half shell sheet; joining the joint edges to the web plate is carried out sequentially with respect to the first half-shell sheet and the second half shell sheet; or applying the joint edges to the web plate and joining the joint edges to the web plate are carried out sequentially with respect to the first half-shell sheet and the second half shell sheet.

4. Method according to claim 1, wherein the edge section of the web plate projecting beyond the joint is shortened; the edge section of the web plate projecting beyond the joint is deformed; or the edge section of the web plate projecting beyond the joint is shortened and deformed.

5. Method according to claim 1, wherein the joint edges of the half-shell sheets are brought into contact with the web plate approximately in alignment on both sides of the web plate.

6. Method according to claim 1, wherein the web plate comprises:
at least one reinforcement;
at least one bead;
a shape defining at least one hole; or
any combination thereof.

7. Method according to claim 1, wherein the joining produces continuous or discontinuous joints.

8. Method according to claim 1, wherein the hollow profile is subsequently joined to other components at the edge section of the web plate projecting beyond the joint edge.

9. Method according to claim 1, wherein the hollow profile is adapted to form at least a portion of a vehicle body.

10. Hollow profile comprising:
two flangeless half-shell sheets; and
a web plate located between the half-shell sheets;
wherein two axially running joint edges of each half-shell sheet are butt joined to the web plate; and
wherein an edge section of the web plate projects beyond two of the joints, so that two flanges are formed for connecting further components, and wherein the web plate extends over a whole length of the hollow profile.

11. Hollow profile according to claim 10, wherein the axially running joint edges of each half-shell sheet are welded to the web plate.

12. Hollow profile according to claim 10, wherein at least one edge section of the web plate is angled relative to a central section of the web plate.

13. Hollow profile according to claim 10, wherein the axially running joint edges of each half-shell sheets are joined with the web plate approximately in alignment with the axially running joint edges of other half sheet joined on an opposite side of the web plate.

14. Hollow profile according to claim 10, wherein the web plate comprises:
at least one reinforcement;
at least one bead;
a shape defining at least one hole; or
any combination thereof.

15. Hollow profile according to claim 10, wherein the joints are continuous or discontinuous.

16. Hollow profile according to claim 10, wherein the hollow profile has a shape of an A-pillar, a B-pillar or a C-pillar that is adapted for vehicle construction, wherein A, B, and C represent different pillar locations with respect to a vehicle assembly.

17. Hollow profile according to claim 10, wherein the hollow profile is adapted to form at least a portion of a vehicle body.

18. Hollow profile produced by:
applying two axially oriented joint edges of a first flangeless half-shell sheet to a first side of a web plate;
applying two axially oriented joint edges of a second flangeless half-shell sheet to an opposite side of the web plate; and
joining the joint edges of the first flangeless half-shell sheet to the web plate and joining the joint edges of the second flangeless half-shell sheet to the web plate, wherein an edge section of the web plate projects beyond a contact area of two of the joint edges forming two flanges adapted for connection with other components, and wherein the web plate extends over a whole length of the hollow profile.

19. Method according to claim 1, wherein a joint edge of the first half-shell sheet is joined to a first side of the web plate and a corresponding joint edge of the second half-shell sheet is simultaneously joined to an opposite side of the web plate.

* * * * *